United States Patent
Zhao et al.

(10) Patent No.: US 12,347,233 B2
(45) Date of Patent: Jul. 1, 2025

(54) METHODS AND SYSTEMS FOR IDENTIFYING AND REDUCING GENDER BIAS AMPLIFICATION

(71) Applicants: Sony Group Corporation, Tokyo (JP); Sony Corporation of America, New York, NY (US)

(72) Inventors: Dorothy Zhao, Princeton, NJ (US); Jerone Andrews, Tokyo (JP); Alice Xiang, Seattle, WA (US)

(73) Assignee: SONY GROUP CORPORATION, Tokyo (JP)

( * ) Notice: Subject to any disclaimer, the term of this patent is extended or adjusted under 35 U.S.C. 154(b) by 418 days.

(21) Appl. No.: 18/054,636

(22) Filed: Nov. 11, 2022

(65) Prior Publication Data

US 2023/0154235 A1 May 18, 2023

Related U.S. Application Data

(60) Provisional application No. 63/371,831, filed on Aug. 18, 2022, provisional application No. 63/263,985, filed on Nov. 12, 2021.

(51) Int. Cl.
*G06V 40/16* (2022.01)

(52) U.S. Cl.
CPC .......... *G06V 40/172* (2022.01); *G06V 40/161* (2022.01); *G06V 40/168* (2022.01)

(58) Field of Classification Search
CPC ...... G06Q 20/204; G06Q 40/12; G06T 17/00; G04W 4/00
See application file for complete search history.

(56) References Cited

U.S. PATENT DOCUMENTS

| | | | | |
|---|---|---|---|---|
| 7,822,605 B2 * | 10/2010 | Zigel | ..................... | G10L 17/06 704/246 |
| 8,219,404 B2 * | 7/2012 | Weinberg | ................ | G10L 17/06 704/250 |

(Continued)

OTHER PUBLICATIONS

Harrison et al., "Mitigating Bias in Facial Recognition with FairGAN", CS 335: Fair, Accountable, and Transparent (FAccT) Deep Learning, Spring 2020, 11 pages.

(Continued)

*Primary Examiner* — Yosef Kassa
(74) *Attorney, Agent, or Firm* — INNOVATION CAPITAL LAW GROUP, LLP; Vic Lin (57) ABSTRACT

A multi-attribute bias amplification metric illustrates the need to consider multiple attributes when measuring bias amplification. For datasets that are perfectly balanced with respect to single attributes, bias amplification can still occur with respect to multi-attributes, regardless of whether raw or absolute differences are used. The metric can be used to show that methods used to mitigate single attribute bias can inadvertently increase multi-attribute bias amplification. Accordingly, the methods for determining bias amplification can provide a better understanding of the extent of bias a model introduces from training to prediction. Further, counterfactuals can be generated to decorrelate the co-occurrences of protected attributes with all background objects, both labeled and unlabeled. These generated counterfactuals can be used for both augmenting training and testing datasets. Using multilabel object classification, it can be demonstrated that training one counterfactual augmented training sets reduces bias along the protected attribute of perceived binary gender expression.

20 Claims, 5 Drawing Sheets

(56) References Cited

U.S. PATENT DOCUMENTS

| | | | | |
|---|---|---|---|---|
| 8,379,920 B2* | 2/2013 | Yang | ............ | G06T 7/187 |
| | | | | 382/164 |
| 8,706,545 B2* | 4/2014 | Narayanaswamy | ............ | |
| | | | | G06Q 20/108 |
| | | | | 705/7.33 |
| 9,094,588 B2* | 7/2015 | Silver | ............ | G06F 18/40 |
| 9,330,523 B2* | 5/2016 | Sutton | ............ | G07F 17/3216 |
| 10,002,337 B2* | 6/2018 | Siddique | ............ | G06Q 30/0601 |
| 10,860,837 B2 | 12/2020 | Ranjan et al. | | |

OTHER PUBLICATIONS

Jain et al., "Imperfect ImaGANation: Implications of GANs Exacerbating Biases on Facial Data Augmentation and Snapchat Selfie Lenses", Jan. 26, 2020, Workshop on Synthetic Data Generation, 11 pages.

Jieyu Zhao et al: "Men Also Like Shopping: Reducing Gender Bias Amplification using Corpus-level Constraints", arxiv.org, Cornell University Library, 201 Olin Library Cornell University Ithaca, NY 14853, Jul. 29, 2017 (Jul. 29, 2017), XP080959841, sections 1, 3, 5 and 6; p. 1, col. 2, paragraph 2; figures 1,2a,2b.

* cited by examiner

METHODS AND SYSTEMS FOR IDENTIFYING AND REDUCING GENDER BIAS AMPLIFICATION

BACKGROUND OF THE INVENTION

1. Field of the Invention

Embodiments of the invention relate generally to bias amplification identification and mitigation. More particularly, embodiments of the invention relate methods and systems for identifying multi-attribute bias amplification and reducing gender bias amplification through synthetically balanced datasets.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

As computer vision systems become more widely deployed, there is increasing concern from both the research community and the public that these systems are not only reproducing but amplifying harmful social biases. The phenomenon of bias amplification refers to models amplifying inherent training set biases at test time.

Existing metrics measure bias amplification with respect to single annotated attributes (e.g., computer). However, several visual datasets consist of images with multiple attribute annotations. Correlations with respect to multiple attributes (e.g., {computer, keyboard}), are not accounted for by current metrics. In addition, current metrics can give the erroneous impression that minimal, or no bias amplification has occurred as they involve aggregating over positive and negative values. Further, these metrics lack a clear desired value, making them difficult to interpret.

Despite their intent to faithfully depict the world, visual datasets are undeniably subject to historical and representational biases. Left unchecked, dataset biases are invariably learned by models, especially when they are sources of efficient features for supervised learning on a given dataset. For example, an image captioning model can learn to generate gendered captions by exploiting contextual cues without ever "looking" at the person in the image. Reliance on spurious correlations is undesirable since these learned associations do not always hold. More significantly, these associations risk not only perpetuating harmful social biases but also amplifying them.

The phenomenon of bias amplification refers to when a model compounds the inherent biases of its training set at test time. Bias amplification has been studied across many tasks. While there are metrics that measure bias amplification in multi-label classification, they only consider the amplification that occurs between a single annotated attribute (e.g., computer) and a group (e.g., female). However, existing large-scale visual datasets often have multiple annotated attributes per image (e.g., {computer, keyboard}). For example, in the COCO dataset, 78.8% of the training set of images are associated with more than a single attribute (i.e., object). Models can thus leverage correlations between a group and either single or multiple attributes simultaneously.

Dataset bias is a well-studied problem in computer vision. Datasets are particularly predisposed to biases reflecting social inequities and disparities between true distributions and their digitized representations. For example, datasets have been found to be demographically imbalanced, with a particular lack of representation of females and individuals with darker skin tones. Further, there are visual differences in the way individuals from different groups are represented or interact with objects in the images.

Biases in datasets can lead to downstream harms when models are trained on these datasets. Beyond reproducing bias, machine learning models have also been found to amplify them. A metric for bias amplification has been proposed that measures the difference in object co-occurrences from the training to predicted distribution. Building on this work, others have proposed the metric "directional bias amplification" to disentangle bias arising from the attribute versus group prediction. An alternative line of work has focused on using leakage—the change in a classifier's ability to predict group membership from the training data to predictions.

There are several proposed methods for mitigating bias amplification at both the dataset and model level. At the dataset level, a popular method has been to use generative adversarial networks (GANs) to create synthetic examples for augmenting the training set. In the natural language processing (NLP) domain, prior works also use generated counterfactuals to reduce biases.

Assuming a person can only co-occur with a single object category at a time, a first-order solution to gender bias mitigation would be to collect additional (or subsample) training instances so that each gender co-occurs equally with every object category. Dropping this naive assumption immediately reveals the intractability of such an approach. Furthermore, there may exist numerous, unaccounted—for contextual cues that spuriously correlate with gender, such as unlabeled person-object interactions. For instance, in the OpenImages dataset, despite there being no significant difference between the co-occurrence of the instrument organ and each gender, females are less likely to be portrayed as playing the organ. Thus, bias amplification can still arise in perfectly balanced datasets, since balancing only addresses labeled, gender-correlated features.

Alternatively, recent work proposed a more sophisticated re-sampling strategies to address spurious correlations with objects, which models often leverage to amplify bias. At the model level, existing mitigation strategies include corpus-level constraints, adversarial debiasing, and domain independent training. Existing methods, however, do not mitigate bias amplification from multiple attributes.

In view of the foregoing, there is a need for metrics for determining gender bias amplification across multiple attributes and methods for reducing gender bias amplification.

SUMMARY OF THE INVENTION

Aspects of the present invention provide methods for measuring multi-attribute bias amplification to evaluate bias amplification arising from single and multiple attributes. Aspects of the present invention further address the issue that aggregated bias amplification metrics include summing positive and negative values. These values can cancel each other out, ostensibly presenting a smaller amount of amplification than what exists. Finally, as opposed to prior metrics that lack a clear ideal value, the methods, according to embodiments of the present invention, are more interpretable.

Using methods, according to embodiments of the present invention, a comparison can be determined between the performance of multi-label classifiers trained on COCO and imSitu, two standard benchmarks for bias amplification metrics. Gender expression bias amplification can be used as a case study. Here, multiple attributes are important to consider. For example, in imSitu, individually the verb unloading and the location indoors are skewed male. However, when considering {unloading, indoors} in conjunction, the dataset is actually skewed female. Significantly, men tend to be pictured unloading packages outdoors whereas women are pictured unloading laundry or dishes indoors. From experiments, it has been found that, on average, that bias amplification arising from single attributes is smaller than that from multi-attributes. Thus, if only individual attributes were considered, it could obscure not only the nuance of understanding that multi-attributes provide but it could also potentially understate bias amplification.

Further, conventional bias mitigation methods can be benchmarked on the methods according to embodiments of the present invention to demonstrate that mitigation methods for single attribute bias can actually increase multi-attribute bias amplification. This further emphasizes the importance of the methods, according to embodiments of the present invention, as the magnitude of bias amplification is likely being underreported using single attribute metrics.

Further, model learning can be augmented by including perceived binary gender expression (PBGE) transformed counterfactual images of every training instance. A distinguishing property of counterfactual augmented training is that it serves to decorrelate both labeled and unlabeled features associated with PBGE.

Beyond training, counterfactual data may also be employed for experimentally uncovering algorithmic bias. Namely, counterfactuals permit the identification of causal relationships between PBGE and variations in model predictions.

Further, aspects of the present invention provide an extension to the prevailing "single-object" bias amplification metric, which can be referred to as "multi-object bias amplification". A unique feature of this metric, according to embodiments of the present invention, is that it permits the quantification of the average magnitude of bias amplification for multiple object categories that simultaneously co-occur with each PBGE.

Aspects of the present invention can validate the efficacy of counterfactual augmented training on the complex Common Objects in Context (COCO) dataset.

Models trained with the counterfactual data, according to aspects of the present invention, consistently outperform strong baselines and algorithmic interventions on several bias amplification metrics including the metrics of the present invention, which incorporates multi-object co-occurrences. Aspects of the present invention further demonstrate the application of counterfactual pairs for identifying biases in models trained on COCO. Notably, while prior works focus on either augmenting training data or evaluating models, aspects of the present invention can be used to show the approaches described herein can be used for both purposes.

Embodiments of the present invention provide a method of determining an extent of a bias, in a model, across a plurality of group membership labels comprising providing a training dataset having multiple training dataset attributes in a plurality of training images of the training dataset; training the model to identify one of the plurality of group membership labels for a training image object in each of the plurality of training images, wherein the training associates the one of the plurality of group membership labels with multiple ones of the multiple training dataset attributes; operating the trained model on a plurality of test images of a test dataset, each of the plurality of test images including a test image object and multiple test dataset attributes, to identify one of the group membership labels for each test image object based on the multiple test dataset attributes; and determining a bias amplification in the identification of one of the plurality of group membership labels for each test image object in each of the plurality of test images.

Embodiments of the present invention further provide a method for measuring multi-attribute bias amplification to evaluate gender bias amplification comprising providing a training dataset having multiple training dataset attributes in a plurality of training images of the training dataset; training a model to identify one of a plurality of group membership labels for a person in each of the plurality of training images, wherein the training associates one of a male gender label or a female gender label with multiple ones of the multiple training dataset attributes; operating the trained model on a plurality of test images of a test dataset, each of the plurality of test images including a test image person and multiple test dataset attributes, to identify one of the male gender label or the female gender label for each test image person based on the multiple test dataset attributes; and determining the gender bias amplification in the identification of either the male gender label or the female gender label for each test image object in each of the plurality of test images.

Embodiments of the present invention also provide a non-transitory computer readable storage medium tangibly embodying a computer readable program code having computer readable instructions that, when executed, causes a computer device to carry out a method of improving computing efficiency of determining an extent of a bias, in a model, across a plurality of group membership labels with respect to multiple attributes, the method comprising providing a training dataset having multiple training dataset attributes in a plurality of training images of the training dataset; training the model to identify one of the plurality of group membership labels for a training image object in each of the plurality of training images, wherein the training associates the one of the plurality of group membership labels with multiple ones of the multiple training dataset attributes; operating the trained model on a plurality of test images of a test dataset, each of the plurality of test images including a test image object and multiple test dataset attributes, to identify one of the group membership labels for each test image object based on the multiple test dataset attributes; and determining a bias amplification in the identification of one of the plurality of group membership labels for each test image object in each of the plurality of test images.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory.

Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

As is well known to those skilled in the art, many careful considerations and compromises typically must be made when designing for the optimal configuration of a commercial implementation of any method or system, and in particular, the embodiments of the present invention. A commercial implementation in accordance with the spirit and teachings of the present invention may be configured according to the needs of the particular application, whereby any aspect(s), feature(s), function(s), result(s), component (s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a multi-attribute bias amplification metric that illustrates the need to consider multiple attributes when measuring bias amplification. For datasets that are perfectly balanced with respect to single attributes, bias amplification can still occur with respect to multi-attributes, regardless of whether raw or absolute differences are used. The metric can be used to show that methods used to mitigate single attribute bias can inadvertently increase multi-attribute bias amplification. Accordingly, the methods for determining bias amplification can provide a better understanding of the extent of bias a model introduces from training to prediction.

Further, counterfactuals can be generated to decorrelate the co-occurrences of protected attributes with all background objects, both labeled and unlabeled. These generated counterfactuals can be used for both augmenting training and testing datasets.

Using multilabel object classification, it can be demonstrated that training one counterfactual augmented training sets reduces bias along the protected attribute of perceived binary gender expression.

Notation $\mathcal{G} = \{g_1, \ldots g_t\}$ and $\mathcal{A} = \{a_1, \ldots a_n\}$ denote a set of t group membership labels and a set of n attributes, respectively. Let $x \in \mathcal{R}^d$ and $y = [g_1, \ldots g_t, a_1, \ldots a_n] \in \{0, 1\}^{t+n}$ an image and its ground truth labels, respectively, sampled from a dataset $\mathcal{D}$. Here $g_i \in \mathcal{G}$ denotes group membership and $a_i \in \mathcal{A}$ denotes the absence (i.e., $a_i=0$) or presence (i.e., $a_i=1$) of attribute i in a. In a case study on gender bias amplification, group membership is $\mathcal{G} = \{\text{male, female}\}$; the attributes are objects in COCO and location and action for imSitu. The metric, according to aspects of the present invention, is easily adaptable to situations where $|\mathcal{G}| > 2$ by iterating over all $g_i \in \mathcal{G}$. Further, $C(a_i, g_i)$ can be used to denote the number of times $a_i$ and $g_i$ co-occur in $\mathcal{D}$. The bias score of an attribute a with respect to group g is defined as:

$$b(a, g) = \frac{C(a, g)}{\sum_{g' \in \mathcal{G}} C(a, g')}$$

Definitions

Undirected Multi-Attribute Bias Amplification

Let m denote a group of multiple attributes where $C(m, g) \geq 1$, and $Var(\bullet)$ denote the variance of a single variate input. Suppose $\mathcal{M}^*$ and $\tilde{\mathcal{M}}$ contain $$\binom{\mathcal{A}}{k}$$

combinations of attributes, $\wedge k \in \mathcal{N} \leq |\mathcal{A}|$, from the ground-truth training and test set, respectively. One can iterate over all m∈ $\mathcal{M}' \subseteq \mathcal{M}^* \cap \tilde{\mathcal{M}}$, where b (m, g)>$|\mathcal{G}|^{-1}$. The undirected multi-attribute bias amplification metric can be defined as:

$$\text{Multi}_{MALS} = X, \text{Var}(\Delta_{mg})$$

where $$X = \frac{1}{|\mathcal{M}'|} \sum_{g' \in G} \sum_{m \in \mathcal{M}'} |\Delta_{mg}| \text{ and}$$

$$\Delta_{mg} = \hat{b}(m_i, g_i) - b(m_i, g_i)$$

It should be noted that $\hat{b}$ (m, g) is the bias score from the attribute and group label test set predictions, whereas b (m, g) is the bias score from the attribute and group label training set ground truths. $\text{Multi}_{MALS}$ therefore measures the change in bias score from the training set ground truths to test set predictions.

When k=1, the metric $\text{Multi}_{MALS}$ reduces to the conventional undirected single-attribute bias amplification metric $\text{BiasAmp}_{MALS}$. Thus, the metric according to aspects of the present invention extends $\text{BiasAmp}_{MALS}$ such that bias amplification from multiple attributes is measured.

Directional Multi-Attribute Bias Amplification

Let $\hat{M}_m$ and $\hat{G}_g$ denote a model's prediction for attribute group, m, and group membership, g, respectively. A version of the metric, according to aspects of the present invention, can be defined to take into account the direction of bias, iterating over all m∈ $\mathcal{M}$ and g∈ $\mathcal{G}$:

$$\text{Multi}_{\rightarrow} = X, \text{Var}(\Delta_{mg})$$

where $$X = \frac{1}{|\mathcal{G}||\mathcal{M}|} \sum_{g \in G} \sum_{m \in \mathcal{M}} |y_{gm} \Delta_{gm} + (1 - y_{gm})(-\Delta_{gm})|$$

$$y_{gm} = 1[P(G_g = 1, M_m = 1) > P(G_g = 1)P(M_m = 1)]$$

$$\Delta_{gm} = \begin{cases} P(\hat{M}_m = 1 | G_g = 1) - P(M_m = 1 | G_g = 1) \\ \quad \text{if measuring } G \rightarrow M \\ P(\hat{G}_g = 1 | M_m = 1) - P(G_g = 1 | M_m = 1) \\ \quad \text{if measuring } M \rightarrow G \end{cases}$$

Unlike $\text{Multi}_{MALS}$, this measures bias amplification arising from the group influencing the attribute prediction ($\text{Multi}_{G \rightarrow M}$), as well as bias amplification from the attribute influencing the group prediction ($\text{Multi}_{M \rightarrow G}$).

When k=1, the metric $\text{Multi}_{\rightarrow}$ reduces to a conventional directional single-attribute bias amplification metric $\text{BiasAmp}_{\rightarrow}$. $\text{Multi}_{\rightarrow}$ and $\text{BiasAmp}_{\rightarrow}$ provide improvements over $\text{Multi}_{MALS}$ and $\text{BiasAmp}_{MALS}$, as they not only disentangle the direction of bias amplification but also take into account the base rates for group membership. The metric $\text{Multi}_{\rightarrow}$, according to aspects of the present invention, can therefore be regarded as an extension of $\text{BiasAmp}_{\rightarrow}$ such that bias amplification from multiple attributes is captured.

Comparison to Conventional Metrics

The multi-attribute bias amplification metric, according to embodiments of the present invention, was compared to conventional metrics for measuring bias amplification. Specifically, three primary advantages are underscored for the metric of the present invention via a contrived scenario using the MNIST dataset.

Setup

Multi-label classification was performed on a synthetically manipulated MNIST dataset. For simplicity, the task was converted to binary classification, such that half of the classes are arbitrarily assigned to group g=0 or g=1. For the attributes, per image, a combination of three corner pixels (a1: top left, a2: bottom left, a3: top right) were set to white. Thus, each image has a corresponding label y=[g, $a_1$, $a_2$, $a_3$], where $a_i \in \{0, 1\}$ corresponds to a pixel being colored black (0) or white (1). A LeNet-5 is trained with stochastic gradient descent (SGD) using a batch size of 32, momentum of 0.9, and learning rate of $10^{-3}$ for 50 epochs. An average over five random group assignments was calculated and the 95% confidence interval is reported.

Advantage 1: The Metric Accounts for Co-Occurrences with Multiple Attributes

If a model, for example, learns the combination of $a_1$ and $a_2$, denoted ($a_1$, $a_2$), are correlated with g, it can exploit this correlation, potentially leading to bias amplification. By limiting the measurement to single attribute co-occurrences, the conventional metrics, $\text{BiasAmp}_{MALS}$ and $\text{BiasAmp}_{\rightarrow}$, do not account for amplification arising from cooccurrences with multiple attributes.

To illustrate this, MNIST was manipulated so that the dataset is perfectly balanced with respect to single attributes, i.e., b($a_i$, g)=0.5 ($\land i \in [1, 2, 3]$), but skewed for multiple attributes. For example, although b($a_1$, g)=b($a_2$, g)=0.5, the bias score for the combination of ($a_1$, $a_2$) and $g_i$ is b(($a_1$, $a_2$), $g_1$)=0.8. Table 1, below, shows the results using the trained models, according to aspects of the present invention, which achieve a mean average precision (mAP) of 89.0±2.6. Bias amplification is 0.0±0.0 for all three single-attribute metrics. However, as shown in Table 1, the bias scores calculated with respect to multiple attributes has increased. Therefore, bias has been amplified but is not being captured by existing metrics.

TABLE 1

| Multi-attributes | b(a, g) | $\hat{b}$(a, g) |
|---|---|---|
| ($a_1$, $a_2$) | 0.80 | 0.92 ± 0.1 |
| ($a_1$, $a_3$) | 0.49 | 0.50 ± 0.0 |
| ($a_2$, $a_3$) | 0.80 | 0.99 ± 0.0 |
| ($a_1$, $a_2$, $a_3$) | 0.94 | 1.00 ± 0.0 |

Significantly, by iterating over all groups in M, the multi-attribute bias amplification metric, according to aspects of the present invention, accounts for amplification from singular and multi-attributes. Attributes exhibiting amplification can be captured which may not have been previously identified. While existing metrics report amplification values close to 0, the multi-attribute metric returns 9.2±2.2, 0.3±0.1, 0.2±0.1 for $\text{Multi}_{MALS}$, $\text{Multi}_{G \rightarrow M}$, and $\text{Multi}_{M \rightarrow G}$, respectively.

Advantage 2: Negative and Positive Values do not Cancel Each Other Out

Existing metrics calculate bias amplification by aggregating over the difference in bias scores for each individual attribute. Suppose there is a dataset with two annotated attributes $a_1$ and $a_2$. It is possible $\Delta_{ga1} \approx -\Delta_{ga2}$ for $\text{BiasAmp}_{MALS}$ or equivalently the difference in bias scores have opposite signs for $\text{BiasAmp}_{\rightarrow}$. In such cases, bias amplification would be approximately 0, which gives the impression bias amplification is minimal to none.

To give a concrete example, $a_1$, $a_2$, and $a_3$ can be arbitrarily set in MNIST to 0 with a probability of 0.7, 0.2, and 0.4, respectively. The model achieves mAP of 85.2±9.9. One of the models results in BiasAmp$_{MALS}$≈0.0, suggesting no bias amplification has occurred. However, upon closer inspection, the bias scores for individual attributes are $\Delta_{ga1}$=0.61 and $\Delta_{ga2}$=−0.60. Some conventional models recognize this limitation and suggest returning group-wise disaggregated pairs per attribute. However, disaggregated values are difficult to interpret and make comparing models cumbersome if not infeasible.

Alternatively, the multi-attribute bias aggregation metric, according to aspects of the present invention, uses the absolute values of differences. Doing so ensures positive and negative bias amplifications per attribute do not cancel each other out. Further, a single metric can be provided, which is more understandable than disaggregated values for all attributes.

Advantage 3: The Metric is More Interpretable

There is a lack of intuition on what an "ideal" amplification value is. One interpretation is that smaller values are more desirable. This becomes less clear when values are negative, as occurs in proposed conventional bias mitigation works. Negative bias amplification indicates bias in the predictions is in the opposite direction than that in the training set. However, this is not always ideal. First, there often exists a trade-off between performance and smaller bias amplification values. Second, high magnitude negative bias amplification may lead to erasure of certain groups. For example, in imSitu, the b(typing, F)=0.52. Negative bias amplification signifies the model underpredicts (typing, F), which could reinforce negative gender stereotypes.

Instead, it may be desirable to minimize the distance between the bias amplification value and 0. This interpretation offers the advantage that large negative values are also not desirable. However, a potential dilemma occurs when interpreting two values with the same magnitude but opposite signs, which is a value-laden decision and depends on the system's context. Additionally, under this alternative interpretation, Advantage 2 becomes more pressing as this suggests models are being interpreted as less biased than they are in practice.

The multi-attribute bias amplification metric, according to aspects of the present invention, is easy to interpret. Since absolute differences are used, the ideal value is unambiguously 0. Further, reporting variance provides intuition about whether amplification is uniform across all attributes or if particular attributes are more amplified.

Evaluating Multi-Attribute Bias Amplification

The advantages of the multi-attribute bias amplification metric, according to aspects of the present invention, are analyzed below. To do so, bias amplification was evaluated when group membership is balanced with respect to single attributes.

Datasets

In the experiments, two datasets were focused on: COCO and imSitu. These datasets were selected as they contain multiple attributes per image and are frequently used in explorations of bias amplification. For attributes, in COCO the prediction of objects was considered and for imSitu, the prediction of the verb and location was considered.

For both datasets, group membership was binary gender expression, i.e., {female, male}. Due to the lack of self-reported demographic annotations, third-party judgement of gender expression was relied upon such third-party judgement can only look at binary labels. It is acknowledged that relying on proxy judgements reifies the incorrect notion that gender identity can be visually inferred and reducing gender to a binary is a harmful practice. It is noted that the multi-attribute bias amplification metric can account for more than one group, so long as there exists relevant annotations.

To derive the labels, for COCO, the provided captions were used. Only objects occurring >100 times with either group were considered, leading to 52 objects in total. For imSitu, group labels were derived using gendered terms for the agent and verbs that have occurred >5 with either group. The 361 verbs that have a location component were considered, where location is a binary prediction between indoor or outdoor.

To balance the datasets with respect to single attributes, there was an iteration over each attribute, a, and a greedy oversampling until the bias score b(a, g) ∈[|G|$^{-1}$±ϵ] for all (a, g), where ϵ=0.025. This results in 45,657, 12,351, and 27,499 images respectively in the training, validation, and test sets for COCO. The splits for imSitu are 40,470, 10,668, and 17,036 images.

Model

A ResNet-50 pre-trained on ImageNet was used. The final layer was replaced to jointly predict the group membership and attributes. The model was trained for 50 epochs using an Adam optimizer with L2 weight decay of 10$^{-6}$, batch size of 32, and a learning rate of 10-5. Based on the known variance in fairness metrics, five models were trained with random seeds and the 95% confidence interval was reported.

Experimental Analysis

The different bias amplification metrics were analyzed after evaluating the "balanced" models. First, the effect of including multiple attributes was examined. Then, the metrics were analyzed when taking the absolute value versus the raw differences. Finally, a closer look into bias amplification arising from group membership to attribute prediction was taken.

Multiple Attributes

To examine the effect of including multi-attributes, the value of k, the minimum number of attributes in a combination, was varied. In Table 2, below, k≥2 (i.e., only combinations of multi-attributes) and k≥1 (i.e., both single and multi-attributes) are considered. Interestingly, for COCO and imSitu, Multi$_{MALS}$ is greater when k≥2 at 18.1±0.4 and 17.6±0.4 versus 17.3±0.4 and 9.3±0.2. This implies the mean bias amplification arising from single attributes is lower than that of multiple attributes.

For imSitu, a large decrease in amplification in Multi$_{A \to G}$ is observed from k≥1 to k≥2. When considering disaggregated values, there is considerably higher bias arising from certain singular verbs, such as constructing, reading, and vacuuming, for A→G prediction. Finally, it is noted, for single attributes, larger bias amplification occurs with attributes that co-occur with males, but more for females when considering multiple attributes.

TABLE 2

| (a) COCO | k => 2 | k => 1 |
|---|---|---|
| Multi$_{MALS}$ | 18.1 ± 0.4, 4.4 ± 0.1 | 17.3 ± 0.4, 4.1 ± 0.1 |
| Multi$_{M \to G}$ | 3.1 ± 0.2, 0.1 ± 0.0 | 3.2 ± 0.2, 0.2 ± 0.0 |
| Multi$_{G \to M}$ | 0.2 ± 0.0, 0.0 ± 0.0 | 0.2 ± 0.0, 0.0 ± 0.0 |
| (b) imSitu | k => 2 | k => 1 |
| Multi$_{MALS}$ | 17.6 ± 0.4, 3.0 ± 0.1 | 9.3 ± 0.2, 1.6 ± 0.1 |
| Multi$_{M \to G}$ | 2.2 ± 0.2, 0.0 ± 0.0 | 6.9 ± 0.1, 1.9 ± 0.0 |
| Multi$_{G \to M}$ | 0.1 ± 0.0, 0.0 ± 0.0 | 0.1 ± 0.0, 0.0 ± 0.0 |

Raw Versus Absolute Differences

How the metrics differ when using raw versus absolute differences is examined. See Tables 3A and 3B, below. First, looking at BiasAmp$_{MALS}$ and Multi$_{MALS}$, it can be seen that bias amplification increases in magnitude when multiple attributes are added. Looking at the variance of Multi$_{MALS}$, it can be seen that it is considerably higher at 4.1±0.1 compared to the variance of 0.2±0.0 for BiasAmp$_{MALS}$. This indicates there are likely specific groups of multi-attribute where there is more bias amplification arising.

Comparing the results for raw versus absolute differences, it is observed that the magnitude increases significantly when using the absolute differences for some metrics. For example, BiasAmp$_{A \to G}$ on imSitu is 0.7±0.1 for raw differences. This value is close to zero, suggesting there is not much bias amplification arising from attribute to group prediction. However, BiasAmp$_{A \to G}$ is 11.9±0.1 when using absolute difference. The large increase in magnitude suggests the negative and positive values for individual attributes are collapsed to zero when taking the mean; this relays an erroneous message that there is minimal bias amplification.

TABLE 3A

| (a) Raw | mAP | BiasAmp$_{MALS}$ | BiasAmp$_{A \to G}$ | BiasAmp$_{G \to A}$ |
|---|---|---|---|---|
| COCO | 53.8 ± 0.1 | −1.0 ± 0.2 | −1.5 ± 0.2 | 0.0 ± 0.0 |
| imSitu | 670 ± 0.1 | 0.3 ± 0.1 | 0.7 ± 0.1 | 0.0 ± 0.0 |
| (b) Absolute | | BiasAmp$_{MALS}$ | BiasAmp$_{A \to G}$ | BiasAmp$_{G \to A}$ |
| COCO | | 5.5 ± 0.2 | 5.0 ± 0.2 | 0.3 ± 0.0 |
| imSitu | | 1.3 ± 0.0 | 11.9 ± 0.1 | 0.1 ± 0.0 |
| (c) Variance | | BiasAmp$_{MALS}$ | BiasAmp$_{A \to G}$ | BiasAmp$_{G \to A}$ |
| COCO | | 0.2 ± 0.0 | 0.4 ± 0.0 | 0.0 ± 0.0 |
| imSitu | | | | |

TABLE 3B

| (a) Raw | Multi$_{MALS}$ | Multi$_{M \to G}$ | Multi$_{G \to M}$ |
|---|---|---|---|
| COCO | −10.1 ± 0.3 | −1.2 ± 0.1 | 0.0 ± 0.0 |
| imSitu | −2.4 ± 0.3 | 1.0 ± 0.1 | 0.0 ± 0.0 |
| (b) Absolute | Multi$_{MALS}$ | Multi$_{M \to G}$ | Multi$_{G \to M}$ |
| COCO | 17.3 ± 0.4 | 3.2 ± 0.2 | 6.2 ± 0.0 |
| imSitu | 9.3 ± 0.2 | 6.9 ± 0.1 | 0.1 ± 0.0 |
| (c) Variance | Multi$_{MALS}$ | Multi$_{M \to G}$ | Multi$_{G \to M}$ |
| COCO | 4.1 ± 0.1 | 6.2 ± 0.0 | 0.0 ± 0.0 |
| imSitu | 1.6 ± 0.1 | 1.9 ± 0.0 | 0.0 ± 0.0 |

G→A Bias Amplification

Figure 1:
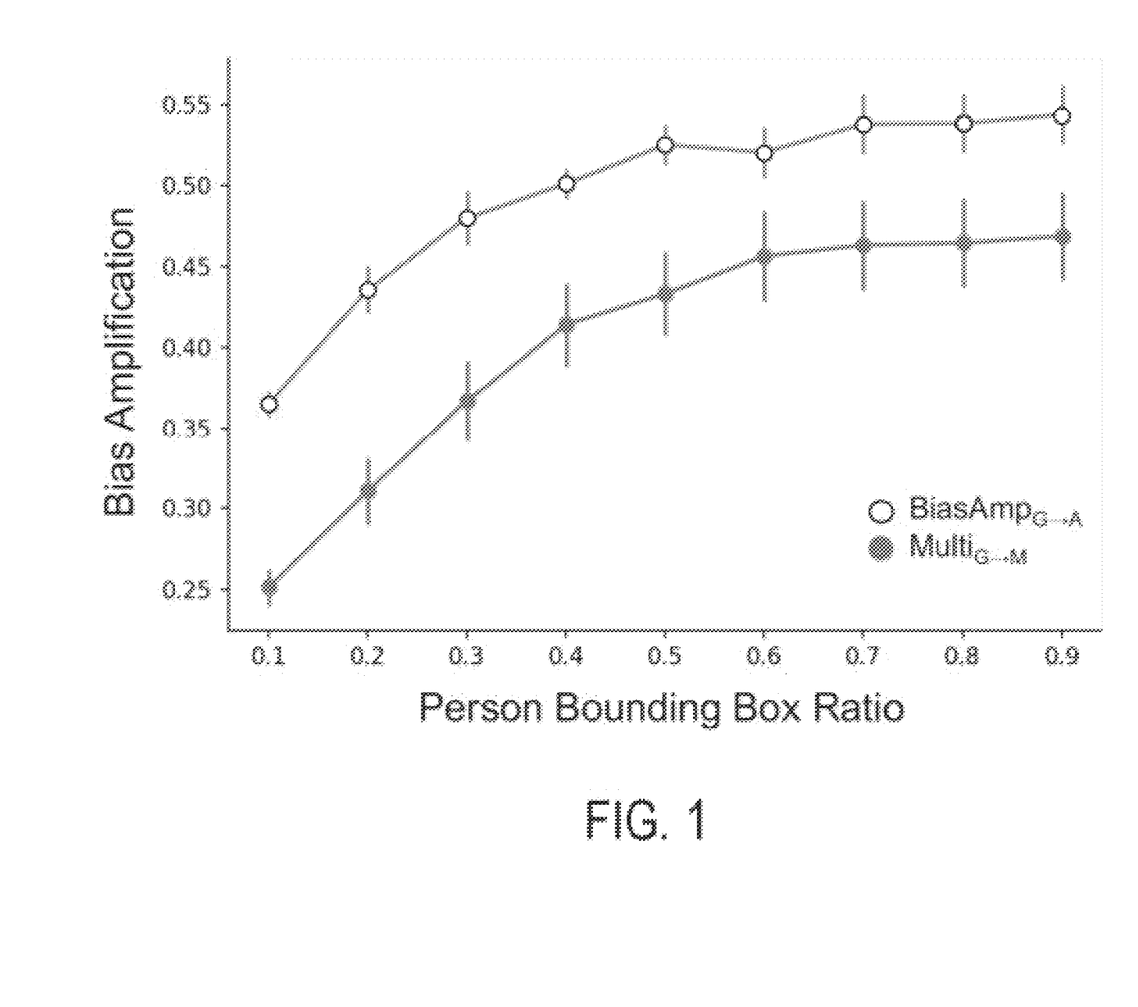
FIG. 1 illustrates G→A bias amplification (calculated using absolute differences) as a function of the person bounding box ratio for COCO, where a bounding box ratio is calculated using the area annotation divided by the image dimensions, where the average over five runs is plotted with random seeds of the model and where error bars represent the standard deviation over runs.

Finally, amplification was observed arising from gender expression to attribute prediction (BiasAmp$_{G \to A}$, Multi$_{G \to M}$) is consistently low. Although spurious correlations with gender exist in many parts of the image, the person is the main source of gender cues. For datasets, such as COCO and imSitu, where the person may be small or not the image's focal point, it is possible group membership is less easily inferred and thus has a smaller impact on attribute prediction. BiasAmp$_{G \to A}$ and Multi$_{G \to M}$ were evaluated with images containing person bounding boxes of varying sizes. There is a strong positive correlation between bias amplification and the person bounding box size with a Pearson's r of 0.89 and 0.92 for BiasAmp$_{G \to A}$ and Multi$_{G \to M}$, respectively, as shown in FIG. 1. This corroborates findings that suggest harder to recognize groups can result in lower bias amplification.

Benchmarking Bias Mitigation Methods

Next, it is considered how previously proposed bias mitigation methods perform when evaluated using multi-attribute bias amplification metrics.

Dataset

Again, COCO and imSitu are used as testbeds for experimentation. The gender and attribute labels are derived using the same process described above. The key difference is that there is no oversampling to balance the attribute and group co-occurrences. As a result, there are 18,177, 4,545, and 10,795 images for the train, validation, and test splits with 30.9% of the instances being male. For imSitu, there are 10,240, 6,175, and 24,698 images in each split with 40.7% of each instance being male.

Mitigation Methods

Five mitigation methods are benchmarked: oversampling, corpus constraints (RBA), adversarial de-biasing (ADV), domain independent training (DOMIND), and data repair. Oversampling refers to the method described above, which greedily samples to balance with respect to single attributes. For each mitigation method, the method is trained using the proposed hyperparameters from conventional use of the benchmarks. Finally, a ResNet-50 is trained without any mitigation techniques as a baseline using the same training protocol described above.

Experimental Analysis

The performance of different mitigation methods was analyzed. First, their performance was considered on single-attribute versus multi-attribute metrics. Second, the performance was examined on mitigating group membership to attribute prediction bias amplification. Finally, the trade-offs are described between different methods. All results are in Tables 4A and 4B, below.

TABLE 4A

| (a) COCO | mAP | BiasAmp$_{MALS}$ | BiasAmp$_{A \to G}$ | BiasAmp$_{G \to A}$ |
|---|---|---|---|---|
| Original | 53.4 ± 0.2 | −0.6 ± 0.3 | 2.2 ± 0.4 | −0.0 ± 0.0 |
| Oversampling | 51.5 ± 0.1 | 1.1 ± 0.1 | −3.4 ± 0.2 | −0.2 ± 0.0 |
| RBA | 50.7 ± 1.1 | 3.8 ± 1.7 | −6.3 ± 3.5 | 0.1 ± 0.0 |
| ADV | 59.0 ± 0.1 | −0.7 ± 0.9 | 7.0 ± 0.6 | 0.1 ± 0.0 |
| Domind | 56.1 ± 0.3 | 0.4 ± 0.6 | 0.0 ± 0.0 | 0.3 ± 0.0 |
| Data Repair | 48.5 ± 0.1 | 0.3 ± 0.1 | 1.9 ± 0.3 | −0.0 ± 0.0 |
| (b) ImSitu | mAP | BiasAmp$_{MALS}$ | BiasAmp$_{A \to G}$ | BiasAmp$_{G \to A}$ |
| Original | 67.1 ± 0.1 | 2.5 ± 0.1 | −0.3 ± 0.1 | 0.0 ± 0.0 |
| Oversampling | 66.3 ± 0.1 | −4.5 ± 0.2 | −2.4 ± 0.1 | −0.0 ± 0.0 |
| RBA | 54.7 ± 0.5 | −1.4 ± 0.3 | −6.2 ± 0.3 | −0.1 ± 0.0 |
| ADV | 58.1 ± 0.1 | 4.1 ± 0.3 | 0.6 ± 0.4 | −0.0 ± 0.0 |
| Domind | 69.6 ± 0.1 | 10.2 ± 0.9 | 0.0 ± 0.0 | 0.1 ± 0.1 |
| Data Repair | 62.3 ± 0.1 | −1.8 ± 0.1 | −0.1 ± 0.1 | −0.0 ± 0.0 |

TABLE 4B

| (a) COCO | Multi$_{MALS}$ | Multi$_{M \to G}$ | Multi$_{G \to M}$ |
|---|---|---|---|
| Original | 15.9 ± 0.7 | 0.4 ± 0.0 | 0.2 ± 0.0 |
| Oversampling | 14.4 ± 0.2 | 0.3 ± 0.0 | 0.3 ± 0.0 |
| RBA | 15.2 ± 0.7 | 7.4 ± 3.3 | 0.5 ± 0.2 |

TABLE 4B-continued

| | | | |
|---|---|---|---|
| ADV | 16.3 ± 0.4 | 1.0 ± 0.2 | 0.3 ± 0.0 |
| Domind | 12.7 ± 0.5 | 0.0 ± 0.0 | 0.3 ± 0.0 |
| Data Repair | 14.0 ± 0.3 | 0.5 ± 0.0 | 0.3 ± 0.0 |
| (b) ImSitu | Multi$_{MALS}$ | Multi$_{M \to G}$ | Multi$_{G \to M}$ |
| Original | 15.1 ± 0.1 | 3.3 ± 0.1 | 0.1 ± 0.0 |
| Oversampling | 15.7 ± 0.4 | 0.2 ± 0.1 | 0.1 ± 0.0 |
| RBA | 17.6 ± 0.3 | 12.4 ± 0.9 | 1.1 ± .01 |
| ADV | 19.1 ± 0.5 | 5.4 ± 0.8 | 0.3 ± 0.1 |
| Domind | 20.3 ± 0.6 | 0.0 ± 0.0 | 0.5 ± 0.2 |
| Data Repair | 21.4 ± 0.3 | 14.0 ± 0.1 | 1.6 ± 0.0 |

Single Attribute Methods do not Always Work for Multiple Attributes

By comparing the performance of mitigation methods on single attribute (i.e., BiasAmp) versus multi-attribute metrics (i.e., Multi), it can be seen how all mitigation methods, save for OVERSAMPLING perform in line with or outperform ORIGINAL on single attribute metrics. However, bias reduction for single attributes does not necessarily indicate bias has been reduced for multi-attributes. On imSitu, RBA reduced BiasAmp$_{MALS}$ from 2.5±0.1 on ORIGINAL to −1.4±0.3, but Multi$_{MALS}$ increased from 15.1±0.1 to 17.6±0.3. In fact, for imSitu, all mitigation methods increased bias relative to ORIGINAL for Multi$_{MALS}$ and Multi$_{G \to M}$. While current mitigation methods may work for single attributes, this leads to greater amplification for multi attributes, indicating that the overall amount of bias amplification may not actually be decreasing. This finding underscores the need for mitigation methods that address bias amplification for both single and multi-attributes.

Mitigation Methods Struggle with G→A Amplification

Subsequently, group to attribute prediction amplification was considered (i.e., BiasAmp$_{G \to A}$, Multi$_{G \to M}$). While the methods can mitigate bias from attribute to group membership prediction, they fare worse in the opposite direction. Save for BiasAmp$_{G \to A}$ on imSitu where DATA REPAIR slightly outperforms ORIGINAL, the baseline model outperforms all mitigation methods on both datasets. This finding is in line with previous reports on G→A amplification in mitigation methods for image captioning. Mitigating G→A amplification, particularly for classification tasks where predicting group membership can be unnecessary and potentially harmful, is an important open direction for future exploration.

Best Mitigation Method is Dataset Dependent

Finally, looking across datasets, no mitigation method clearly outperforms another. For example, DOMIND outperforms ORIGINAL for COCO on all metrics except for BiasAmp$_{G \to A}$ and Multi$_{G \to M}$; however, the method fares worse on imSitu. This is likely because DOMIND attempts to distinguish between group membership within attributes (e.g., woman with computer versus man with computer). Since imSitu attributes, such as indoor or outdoor location, are broadly defined and have diverse appearances compared to objects in COCO, it may be more difficult to learn these boundaries. A potential avenue for inquiry is developing training methods that work well for more general attributes like those found in imSitu.

Counterfactual Augmented Training

As briefly discussed above, model learning can be augmented by including perceived binary gender expression (PBGE) transformed counterfactual images of every training instance. A distinguishing property of counterfactual augmented training is that it serves to decorrelate both labeled and unlabeled features associated with PBGE.

Beyond training, counterfactual data may also be employed for experimentally uncovering algorithmic bias. Namely, counterfactuals permit the identification of causal relationships between PBGE and variations in model predictions.

The efficacy of using methods according to the present invention, by using datasets including counterfactual data (also referred to as "Balanced Synthetic" datasets) where studied to generate a synthetically balanced training set. To construct Balanced Synthetic, for each original image x in the training set, (x, y) and the counterfactual tuple (x, y) are both included.

Experimental Setup

Dataset

Methods, according to aspects of the present invention, are applied to the COCO dataset. COCO is a popular dataset for many computer vision tasks, making it an important testbed for investigating and mitigating bias.

Training and validation sets are created using images containing one person from the 2014 train and validation splits, respectively, which contain person instances with PBGE labels. In total, 6,894 images were used in the training split and 1,500 in the validation split. In addition to PBGE, all 80 objects in the COCO dataset were considered.

Since COCO only provides person-level segmentation masks, faces were detected using MTCNN with a low threshold of 0.5. This is done because detected faces are further pruned during pre-processing. In addition, cause there are no human-annotated PBGE labels for the COCO 2014 training set, the labels were automatically derived from the COCO captions. Conventional protocols were adopted for deriving gender expression; however, an expanded keyword list was used for querying the captions. Consistent with prior works, the distribution of PBGE is skewed in the training set with 60.9% and 39.1% of persons perceived as masculine (masc.) and feminine (fem.), respectively. The distribution for Balanced Synthetic is, of course, balanced given the counterfactual (x', y') is included for each (x, y).

Model

A ResNet-50 was pre-trained on ImageNet. The final linear layer was replaced to jointly predict y—the objects $o\{1, \ldots, c\}$ and $p_g$. The model is trained for 15 epochs using an Adam optimizer with L2 weight decay equal to 1e−5 and a batch size of 32. The learning rate is 1e−4.

Baselines

In total, the debiasing method (Balanced Synthetic) was compared against 8 different baselines. Original refers to the baseline without any debiasing attempts. For each COCO image, a horizontally flipped version was included to match the number of images in the Balanced Synthetic. Similar to Original, the reconstructed version of the detected face from the Fader Network (i.e., no changes to PBGE) was used for Reconstructed. This baseline was included to evaluate how synthetic images—irrespective of gender expression manipulations—affect the classifier. To compare against a gender-expression balanced dataset, Naive Balanced was included. Here, the number of fem. and masc. images were balanced without taking into account co-occurrences with objects.

Three adversarial methods were used that occlude or reduce PBGE signals, as strong baselines. First, the detected faces were occluded with a black square (Blackout—Face). Also, the entire person segmentation provided by COCO was occluded, removing all gender expression signals from the individual (Blackout—Segm). Depending on the segmentation granularity, objects with which the person interacts may be occluded. Finally, the segmentation was altered by applying a Gaussian blur with a kernel size of 43×43 to the segmentation (Blur—Segm).

Finally, two algorithmic interventions were included. Reducing Bias Amplification (RBA) was used. This method applies corpus-level constraints to ensure the distribution of output predictions matches that of the training set. RBA is solved using a Lagrangian relaxation iterative solver and stops when the calibration constraints have been met or when 100 iterations are completed. Lastly, Balanced Synthetic was compared against Domain Independent. This method addresses the concern the model may learn to distinguish between domains within an object class. Two classifiers are trained—one for $p_{masc}$. and one for $p_{fem}$.—and share feature representations across the classifiers. At inference-time, the outputs were summed from the two domains, as doing so achieves the best performance.

Comparison with Baselines

The Balanced Synthetic method, according to aspects of the present invention, were compared to the baselines. A test set of 3,242 images from COCO were used containing only one person. The PBGE distribution of this test set is skewed, mirroring the unaltered training set distribution with 66.5% masc. images and 33.5% fem. images.

Metrics

The mean average precision (mAP), or the average area under the precision-recall curve across all object categories, was used to evaluate the classifier performance. Here, mAP only accounts for the 80 object categories and not the gender expression prediction.

Four different metrics for measuring bias amplification were used. The first metric, $BA_{MALS}$, captures the change in object co-occurrences from the training set to predictions. This metric only considers changes for objects that are positively correlated with the respective protected attribute in the training set. Second, directional bias amplification was used, which consists of two metrics: $BA_{A \to T}$ and $BA_{T \to A}$. Here, A refers to the protected attribute, $p_g$, and T refers to the binary object prediction tasks, $o\{1, \ldots, c\}$. $BA_{A \to T}$ corresponds to bias amplification that arises from attribute prediction influencing task prediction. Conversely, $BA_{T \to A}$ measures bias amplification from the task influencing attribute prediction. Finally, bias amplification account for co-occurrences with multiple objects was measured using $Multi_{BA}$ and multi-object directional bias amplification ($Multi_{A \to T}$, $Multi_{T \to A}$).

To provide intuition behind desirable values for bias amplification metrics, it is assumed that an ideally fair classifier makes predictions such that the protected attribute is uncorrelated with the objects. For example, in $BA_{MALS}$, it is assumed that b*(o, g)=0.5 for all objects o. The target value is calculated for all metrics except for $Multi_{A \to T}$ as it is unclear what an ideally fair probability would be for a predicted group of objects condition on PBGE.

The bias amplification metrics are influenced by the selected classification threshold. For the experiments, the classification threshold was calibrated based on the validation set. This threshold was chosen such that the proportion of predicted positive labels matches that of the ground-truth.

Results

Tables 5A and 5B show the results for mAP and the bias metrics. First, it was found that for mAP, Original (44.54±0.92) performs significantly better (p=0.001) than Balanced Synthetic (42.38±1.35) based on a two-sample t-test. It was noted that the mAP of Original is also significantly higher (p<0.05) for all other cases as well. This dip in performance is consistent with other conventional methods proposed for reducing bias amplification. Second, it was observed that mAP decreases between Original and Reconstructed. Since attribute prediction influences object prediction, the decrease in facial image quality for Reconstructed may have affected the model's performance.

For the fairness metrics, the method according to aspects of the present invention performs in line or better than the baselines. Across all cases, Balanced Synthetic performs closest to the target values on $BA_{MALS}$ (−0.075±0.035), $BA_{T \to A}$ (−0.096±0.046), $Multi_{BA}$ (−0.178±0.048), and $Multi_{T \to A}$ (−0.021±0.005).

For $BA_{T \to A}$ and $Multi_{T \to A}$, this indicates the method according to aspects of the present invention relies less on visual cues from the objects to predict the gender expression. This is expected given that the attribute and the objects have been decorrelated. It was noted that Blackout—Segm (−0.002±0.001), RBA (−0.002±0.001), and Domain Independent (−0.002±0.001) perform better for $BA_{A \to T}$. In particular, for Blackout—Segm, gender expression cues have been occluded, making it unlikely for the attribute to influence the object prediction. Overall, the method according to aspects of the present invention is the only bias mitigation technique that performs better than Original across all fairness metrics.

TABLE 5A

|  | mAP | $BA_{MALS}$ | $BA_{A \to T}$ | $BA_{T \to A}$ |
|---|---|---|---|---|
| Target | 100.0 | −0.166 | −0.008 | −0.106 |
| Original | 44.54 ± 0.92 | −0.031 ± 0.024 | −0.001 ± 0.001 | −0.054 ± 0.021 |
| Recon | 44.93 ± 1.15 | −0.032 ± 0.036 | −0.001 ± 0.001 | −0.029 ± 0.027 |
| Naïve Bal. | 44.73 ± 0.73 | −0.036 ± 0.013 | −0.001 ± 0.001 | −0.046 ± 0.042 |
| Blackout-Face | 44.46 ± 0.39 | −0.017 ± 0.014 | −0.001 ± 0.000 | −0.031 ± 0.018 |
| Blackout-Segm | 38.53 ± 1.16 | −0.017 ± 0.026 | −0.002 ± 0.001 | −0.062 ± 0.055 |
| Blur-Segm | 42.19 ± 1.09 | −0.026 ± 0.022 | −0.001 ± 0.000 | −0.022 ± 0.034 |
| RBA | 39.68 ± 1.50 | −0.023 ± 0.039 | −0.002 ± 0.001 | −0.078 ± 0.028 |
| Domain Ind. | 40.89 ± 0.69 | −0.051 ± 0.020 | −0.002 ± 0.001 | −0.028 ± 0.033 |
| Balanced Syn. | 42.38 ± 1.35 | −0.075 ± 0.035 | −0.001 ± 0.001 | −0.096 ± 0.045 |

TABLE 5B

|  | $Multi_{BA}$ | $Multi_{A \to T}$ | $Multi_{T \to A}$ |
|---|---|---|---|
| Target | −0.237 |  | −0.050 |
| Original | −0.099 ± 0.021 | 0.000 ± 0.001 | −0.004 ± 0.005 |
| Recon | −0.089 ± 0.037 | 0.000 ± 0.001 | −0.001 ± 0.004 |
| Naïve Bal. | −0.101 ± 0.022 | 0.000 ± 0.002 | −0.006 ± 0.005 |
| Blackout-Face | −0.081 ± 0.034 | 0.000 ± 0.002 | −0.001 ± 0.003 |
| Blackout-Segm | −0.101 ± 0.036 | 0.000 ± 0.001 | −0.007 ± 0.005 |
| Blur-Segm | −0.116 ± 0.024 | −0.001 ± 0.001 | 0.002 ± 0.004 |
| RBA | −0.097 ± 0.017 | −0.001 ± 0.002 | −0.001 ± 0.008 |
| Domain Ind. | −0.126 ± 0.023 | −0.001 ± 0.001 | −0.002 ± 0.002 |
| Balanced Syn. | −0.178 ± 0.048 | 0.000 ± 0.002 | −0.021 ± 0.005 |

Qualitative Analysis

The Grad-CAMs of PBGE predictions was visualized for method according to aspects of the present invention and three baselines—Original, Blackout—Segm, and Domain Independent. Ideally, the model should focus on the person when predicting PBGE, as opposed to the background or other objects in the image. For example, in some images, the other three models may focus on background objects in a kitchen to predict the person's gender expression. Even if the predictions are correct, they still exploit spurious correlations which may reflect existing social stereotypes.

Compared to other methods, Balanced Synthetic focuses more on the person, usually the facial area, rather than relying on other visual cues. This observation is in line with the finding that Balanced Synthetic performs the best on $BA_{A \to T}$, indicating the model relies less on visual cues from the task to predict the attribute. In addition, it was observed that the model is more likely to focus on facial features when the ground-truth PBGE is fem. or if the PBGE is more difficult to infer (e.g., face is smaller or partially occluded).

Evaluating on Balanced Test Sets

Next, the results were compared on two balanced test sets. For the first test set, the method iteratively subsampled images until the co-occurrences between PBGE and all objects are approximately balanced. Since the images were subsampled, the resulting test set is smaller (n=717). Second, a synthetically balanced test set was created using the same method that was used for generating the training set. The synthetically balanced test set contained 4,396 images. Since the two test sets are of different sizes and from different distributions, metrics were not compared across the two test sets; however, the relative ordering of models can be considered.

Metrics

As in the above, mAP was used to measure performance. However, for this analysis, a modified metric, $\Delta c$, was used for calculating bias. Since existing bias amplification metrics do not include object categories that are perfectly balanced, when a balanced test set was used, these bias metrics default to 0.

The formal definition for $\Delta c$ is as follows:

$$\Delta c = \frac{1}{|G||M|} \sum_{p_g} \sum_{m} |b(m, p_g) - b'(m, p_g)|$$

Here M consists of both single objects, $o \in O$, and multiple objects, b'(m, pg) refers to the bias score of the ground-truth test set. Intuitively, this metric measures the absolute difference between predicted and ground-truth bias scores. Values closer to 0 indicate the predictions more closely match the ground-truth.

Results

The models were evaluated using the subsampled balanced test set (see Table 6, below) and synthetically balanced test set (see Table 7, below). In line with the above analysis, it was found that Original had the highest mAP with 42.25±2.04 and 43.64±1.16 respectively. It is noted that there is not a statistically significant difference between Original and Balanced Synthetic, which achieved a mAP of 39.97±2.62 and 42.07±1.36. Further, the performance on "rare instances"—a subset of test images containing the top 10% most biased objects in the training set and PBGE that is not correlated with the object—was benchmarked using the metric RaremAP. Balanced Synthetic outperforms all other methods, suggesting that this method can help combat erasure as it performs better on instances that may not conform to gender stereotypes. Finally, Balanced Synthetic has the lowest $\Delta c$ on both the subsampled test set (0.176±0.030) and synthetically balanced test set (0.119±0.029), for which the method, according to aspects of the present invention, performs significantly better than other methods.

TABLE 6

|  | mAP | $\Delta c$ |
|---|---|---|
| Original | 42.25 ± 2.04 | 0.189 ± 0.018 |
| Recon. | 41.30 ± 2.65 | 0.203 ± 0.024 |
| Naïve Bal. | 41.30 ± 1.34 | 0.201 ± 0.032 |
| Blackout-Face | 40.97 ± 1.48 | 0.211 ± 0.044 |
| Blackout-Segm | 34.00 ± 1.31 | 0.204 ± 0.058 |
| Blur-Segm | 39.87 ± 1.56 | 0.224 ± 0.051 |
| Domain Ind. | 38.50 ± 1.45 | 0.192 ± 0.023 |
| Balanced Synthetic | 39.97 ± 2.62 | 0.176 ± 0.030 |

TABLE 7

|  | mAP | Rare mAP | $\Delta c$ |
|---|---|---|---|
| Original | 43.64 ± 1.16 | 38.55 ± 3.15 | 0.200 ± 0.025 |
| Recon. | 43.11 ± 0.61 | 38.21 ± 2.03 | 0.217 ± 0.023 |
| Naïve Bal. | 42.84 ± 1.02 | 37.75 ± 2.37 | 0.204 ± 0.029 |
| Blackout-Face | 38.07 ± 3.87 | 42.65 ± 0.53 | 0.236 ± 0.040 |
| Blackout-Segm | 31.65 ± 1.53 | 37.97 ± 1.06 | 0.216 ± 0.053 |
| Blur-Segm | 35.36 ± 1.58 | 42.07 ± 0.81 | 0.233 ± 0.035 |
| Domain Ind. | 35.06 ± 2.25 | 40.05 ± 0.82 | 0.193 ± 0.017 |
| Balanced Synthetic | 42.07 ± 1.36 | 38.84 ± 2.02 | 0.119 ± 0.029 |

Predicting Perceived Binary Gender Expression

Finally, the PBGE predictions were analyzed on images without people. This was done to understand how the objects in the image affect PBGE prediction, irrespective of the person's appearance. In total, 18,503 images were used from the COCO 2014 validation set that have one or more labelled objects (but no person objects).

The mean predicted PBGE probabilities were reported over each test image for the different methods in shown in Table 7. Recall in the annotation schema, $p_{masc}$. 1 and $p_{fem}$. 0. Balanced Synthetic is the only model that achieves a probability close to 0.5 for both images with a single object (0.53±0.12) and multiple objects (0.53±0.09). The remaining 7 cases all have mean probabilities greater than 0.6. This indicates models are more likely to predict an image is masc. even if no person is present.

This difference in predicted PBGE is not solely attributable to the skewed training distribution. First, Naïve Balanced, which also has a balanced training set, has a mean probability of 0.65±0.15. This is significantly higher than 0.5. Second, for single object images, none of the other bias mitigation methods reduce the probability of an image being classified as masc. relative to Original. Further, methods trained on the skewed dataset overpredict that images are masc. compared to the training distribution (60.9% masc.). Only synthetically balancing the dataset and blurring have mean probabilities with less than a 3.0% difference from their respective training distributions.

The images predicted to be highly fem. or masc. (i.e., probability>0.95) were considered. First, using the COCO Stuff annotations, the scene location of the images (i.e., indoor or outdoor) was analyzed. For all of the models except Balanced Synthetic, images predicted to be fem. were more likely to be in an indoor setting; images predicted to be masc. were more likely to be in an outdoor setting. Observations corroborate conventional models that suggest images of male and female individuals differ in visual appearance. Second, a qualitative analysis of these images was conducted. It was observed that images of animals tend to be classified as masculine. When visualizing the predictions with Grad-CAM, it was found that the models tend to focus on the face of the animal when predicting PBGE. This may indicate that the model has learned to associate any face, human or not, with being masculine. Overall, the findings reaffirm claims that bias amplification can still arise in balanced datasets when only labeled, gender-correlated features are addressed, leaving many unlabeled features for models to exploit.

Counterfactual Augmented Testing

The methods according to aspects of the present invention can be used to uncover biases in existing models. To do so, a test set was created consisting of counterfactual pairs of images, differing only by the PBGE of the individual pictured. Given that all else is held equal in the counterfactual pairs, the differences in model predictions arising solely from PBGE can be determined. For the test set, images from the COCO 2014 validation set can be used with crowd-sourced gender annotations. The dataset as discussed above, where, for (x, y), the reconstructed face from the Fader Network was used, reducing the chance that differences in output arise from the change in facial image quality. In total, 2,198 pairs of images were used.

Case Study. To illustrate how the generated test set can be used to uncover biases, Original was used as a case study. Two sets of transformations are provided: originally masc. images with a synthetically fem. counterfactual (M→F) and vice versa (F→M). For each object category, the L1 distance between the normalized logits of the original and synthetic images is calculated. Further, it is desirable to isolate the objects that had large differences either in the M→F or F→M direction as this indicates the directionality of the PBGE change affects the model's prediction. Thus, in FIGS. 2A and 2B the difference between the M→F and F→M transformations is shown.

Figure 2A:
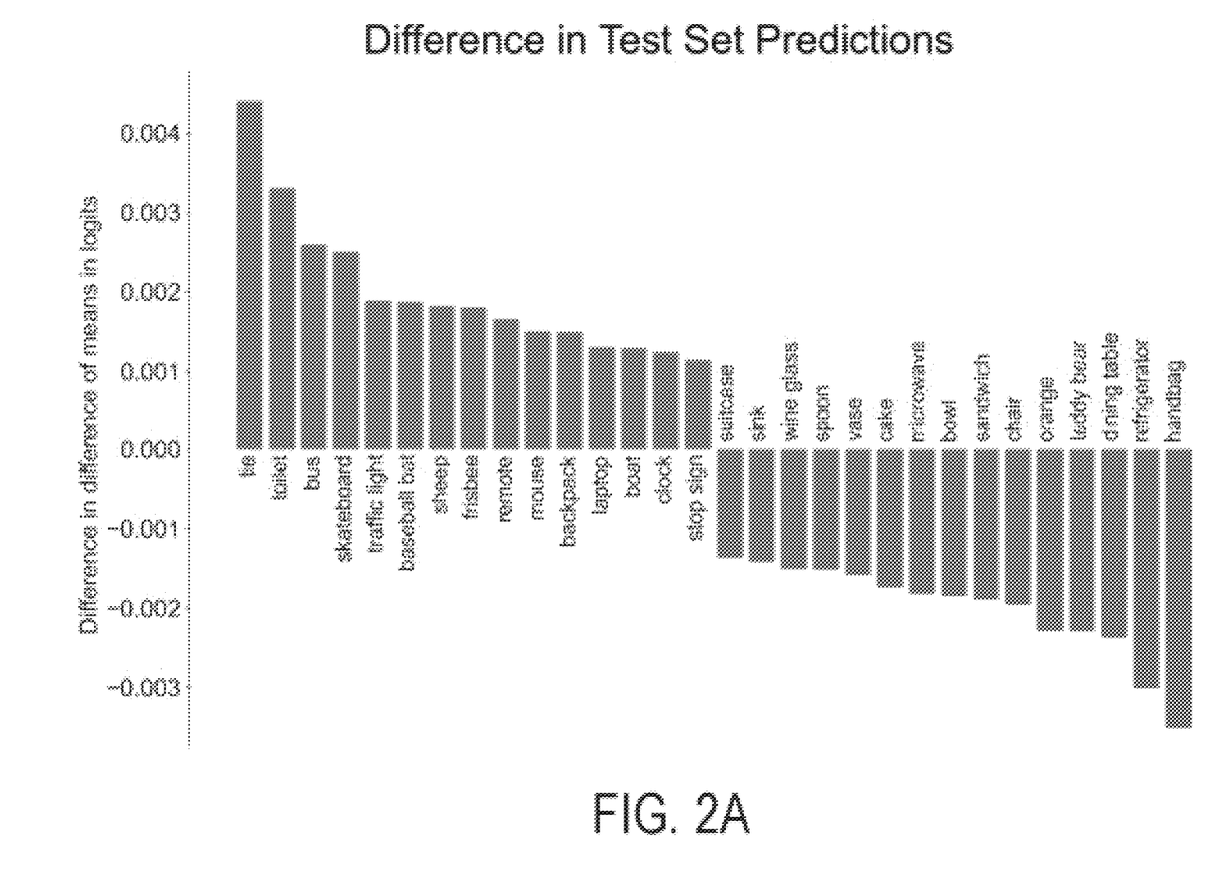
FIG. 2A illustrates the top 15 object categories that are more likely to be predicted when the image is masculine versus feminine.
Figure 2B:
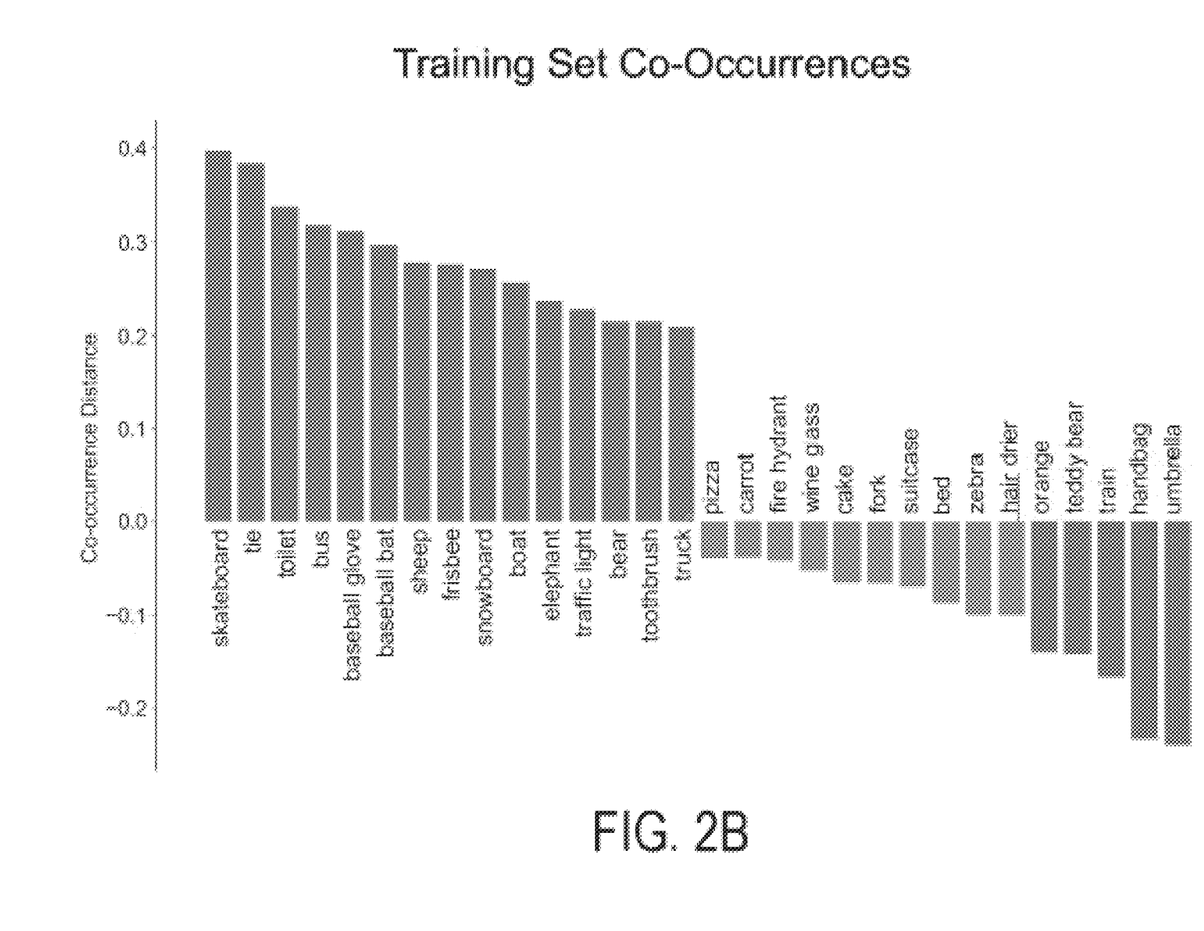
FIG. 2B illustrates the 15 object categories that are most skewed towards feminine or masculine in the training set of COCO.

Intuitively, more positive results indicate the object is more likely to be predicted for pmasc. and more negative results indicate the object is more likely for pfem.

From the results of FIGS. 2A and 2B, two observations can be made. First, sports-oriented (e.g., frisbee, baseball bat) and technology-oriented objects (e.g., laptop, mouse) have higher logits for masc. individuals. Similarly, kitchen oriented objects (e.g., refrigerator, microwave) are more likely to be predicted for fem. individuals. This is consistent with previous work that uncovered similar gendered stereotypes in the COCO dataset, suggesting that the methods according to aspects of the present invention are able to uncover biases in the person-object co-occurrences in the training dataset. Second, 15 of the 30 objects with the greatest differences in prediction probability overlap with the most skewed objects in the training set. This suggests an additional use case for the method: uncovering potential dataset biases. Since the analysis only uses model predictions, insight can be gained into labeled, gender correlated features (e.g., object categories) in cases where there is no access to the underlying training data (e.g., evaluating an external model).

Advantages

The insights unearthed using the synthetic test set can be used as action items for mitigating model bias. The present approach differs from previous approaches since it measures the model's biases directly instead of examining the training data. Subsequently, the training set can be augmented with counterfactuals for particularly skewed labels to mitigate identified sources of biases. In addition, using synthetic data allows researchers to take more of an experimental, rather than observational, approach and understand the causal relationship between the protected attribute and predictions. For example, while $\alpha=2.0$ was fixed herein, aspects of the present invention can also easily create interpolations with different a values to modify the intensity of the PBGE swap.

Figure 3:
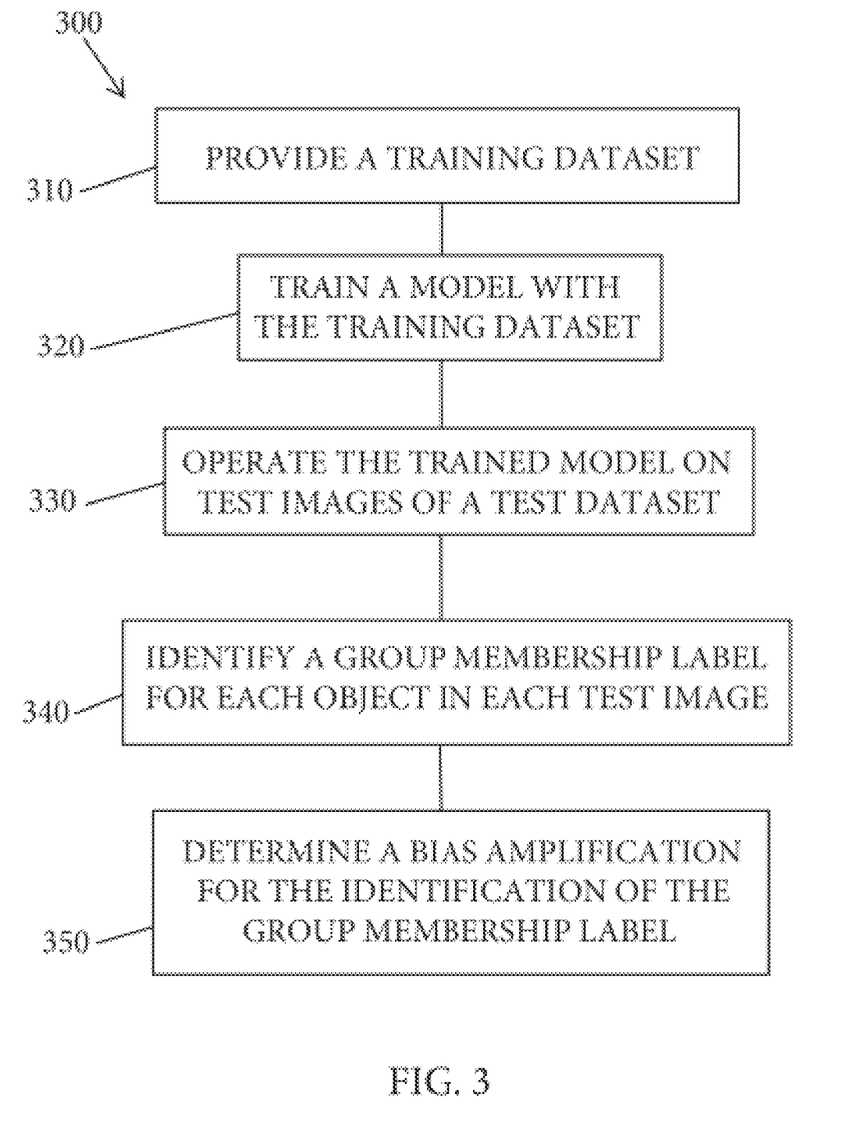
FIG. 3 illustrates a flow chart describing a method according to an exemplary embodiment of the present invention.

With the foregoing overview of the exemplary methods for measuring multi-attribute bias amplification, it may be helpful now to consider a high-level discussion of example processes. To that end, FIG. 3 presents an illustrative process 300 related to methods of determining an extent of a bias in a model. Process 300 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 3, the process 300 for determining an extent of a bias, such as gender bias, in a model includes an act 310 of providing a training dataset, where the training dataset has multiple training dataset attributes in a plurality of training images. The process can further include an act 320 of training a model with the training dataset. This training can be used to identify one of the plurality of group membership labels for a training image object in each of the plurality of training images. The training can associate the one of the plurality of group membership labels with multiple ones of the multiple training dataset attributes. The process can further include an act 330 of operating the trained model on a plurality of test images of a test dataset. Each of the plurality of test images can include a test image object and multiple test dataset attributes. The trained model can be used in an act 340 for determining one of the group membership labels for each test image object based on the multiple test dataset attributes. The process can further include an act 350 of determining a bias amplification in the identification of one of the plurality of group membership labels for each test image object in each of the plurality of test images.

Figure 4:
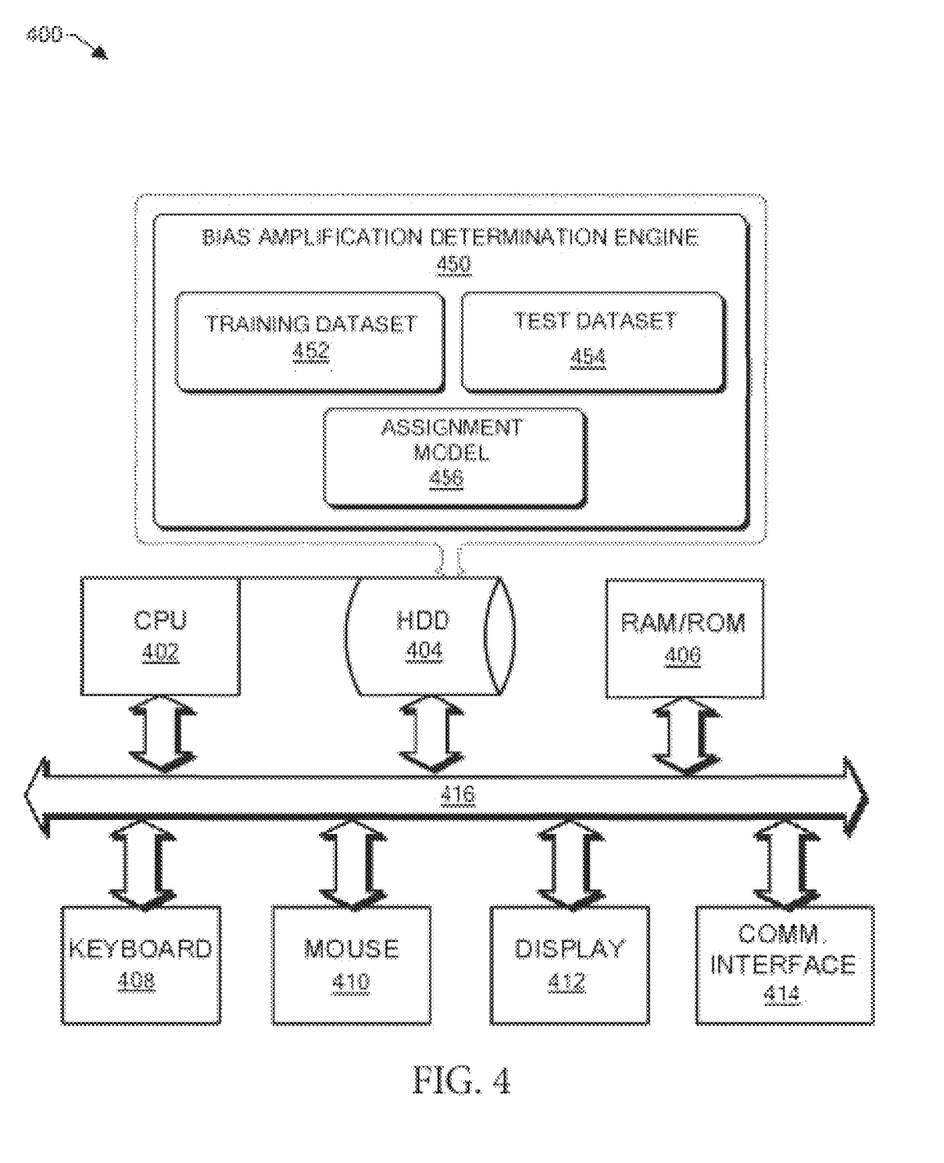
FIG. 4 illustrates a functional block diagram illustration of a particularly configured computer hardware platform that can be used to implement a method for determining an extent of bias amplification, consistent with an illustrative embodiment.

FIG. 4 provides a functional block diagram illustration of a computer hardware platform 400 that can be used to implement a particularly configured computing device that can host a bias amplification determination engine 450. The bias amplification determination engine 450, as discussed above, can include a training dataset 452, a test dataset 454 and an assignment model 456 to assign a gender to objects, such as people, in an image.

The computer platform 400 may include a central processing unit (CPU) 402, a hard disk drive (HDD) 404, random access memory (RAM) and/or read only memory (ROM) 406, a keyboard 408, a mouse 410, a display 412, and a communication interface 414, which are connected to a system bus 416.

In one embodiment, the HDD 404, has capabilities that include storing a program that can execute various processes, such as the bias amplification determination engine 450, in a manner to perform the methods described herein. In another implementation, some or all of the data of either or both of the training dataset 452 and the test dataset 454 are stored separately or outside of the bias amplification determination engine 450, such as in another area of storage in the HDD 404 or storage outside of the computer platform 400 (for example in a network location).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method of determining an extent of a bias, in a model, across a plurality of group membership labels, comprising:
providing a training dataset having multiple training dataset attributes in a plurality of training images of the training dataset;
training the model to identify one of the plurality of group membership labels for a training image object in each of the plurality of training images, wherein the training associates the one of the plurality of group membership labels with multiple ones of the multiple training dataset attributes;
operating the trained model on a plurality of test images of a test dataset, each of the plurality of test images including a test image object and multiple test dataset attributes, to identify one of the group membership labels for each test image object based on the multiple test dataset attributes; and
determining a bias amplification in the identification of one of the plurality of group membership labels for each test image object in each of the plurality of test images.

2. The method of claim 1, wherein the test image object and the training image object are images of people.

3. The method of claim 1, wherein the bias is gender bias.

4. The method of claim 3, wherein the plurality of group membership labels includes a male gender label and a female gender label.

5. The method of claim 1, wherein the multiple training dataset attributes and the multiple test dataset attributes include actions describing the training image object and the test dataset object, respectively, of each of the plurality of training images and each of the plurality of test images, respectively.

6. The method of claim 1, wherein the multiple training dataset attributes and the multiple test dataset attributes include physical objects within each of the plurality of training images and each of the plurality of test images, respectively.

7. The method of claim 1, further comprising calculating a bias score correlated to the determined bias, wherein the bias score uses an absolute value of differences between the determined bias and a ground truth.

8. The method of claim 7, wherein
the bias score of an attribute a with respect to group g is defined as:

$$b(a, g) = \frac{C(a, g)}{\sum_{g' \in \mathcal{G}} C(a, g')}$$

where $\mathcal{G} = \{g_1, \ldots g_t\}$ and $\mathcal{A} = \{a_1, \ldots a_n\}$ a set of t group membership labels and a set of n attributes, respectively, $x \in \mathcal{R}^d$ and $y=[g_1, \ldots g_t, a_1, \ldots a_n] \in \{0, 1\}^{t+n}$ are an image and ground truth labels, respectively, sampled from a dataset $\mathcal{D}$, $g_i \in \mathcal{G}$ denotes group membership and $a_i \in \mathcal{A}$ denotes the absence, $a_i=0$, or presence, $a_i=1$, of attribute i in a.

9. The method of claim 1, wherein a bias amplification is reported based on a distance of the determined bias from a zero value.

10. The method of claim 1, further comprising reporting a variance in the determined bias amplification, the variance signifying whether a bias amplification is uniform across all of the multiple attributes.

11. The method of claim 1, further comprising reducing the bias amplification by generating synthetically balanced datasets based on at least one of the training dataset and the test dataset.

12. The method of claim 1, further comprising generating a counterfactual image for each of the plurality of training images, wherein:
the training image object is an image of a person;
the bias is gender bias;
the plurality of group membership labels includes a male gender label and a female gender label; and
the counterfactual image changes a perceived binary gender expression, identified in the training dataset, of a first training image object from a male gender to a female gender, and the counterfactual image changes the perceived binary gender expression, identified in the training dataset, of a second training image object from the female gender to the male gender.

13. A method for measuring multi-attribute bias amplification to evaluate gender bias amplification, comprising:
providing a training dataset having multiple training dataset attributes in a plurality of training images of the training dataset;
training a model to identify one of a plurality of group membership labels for a person in each of the plurality of training images, wherein the training associates one of a male gender label or a female gender label with multiple ones of the multiple training dataset attributes;
operating the trained model on a plurality of test images of a test dataset, each of the plurality of test images including a test image person and multiple test dataset attributes, to identify one of the male gender label or the female gender label for each test image person based on the multiple test dataset attributes; and
determining the gender bias amplification in the identification of either the male gender label or the female gender label for each test image object in each of the plurality of test images.

14. The method of claim 13, wherein the multiple training dataset attributes and the multiple test dataset attributes include at least one of actions, describing each of the plurality of training images and each of the plurality of test images, respectively, or physical objects within each of the plurality of training images and each of the plurality of test images, respectively.

15. The method of claim 13, further comprising reducing the gender bias amplification by generating synthetically balanced datasets based on at least one of the training dataset and the test dataset.

16. The method of claim 13, further comprising generating a counterfactual image for each of the plurality of training images, wherein the counterfactual image changes a perceived binary gender expression, identified in the training dataset, of a first training image object from a male gender to a female gender, and the counterfactual image changes the perceived binary gender expression, identified in a second training dataset, of the training image object from the female gender to the male gender.

17. A non-transitory computer readable storage medium tangibly embodying a computer readable program code having computer readable instructions that, when executed, causes a computer device to carry out a method of improving computing efficiency of determining an extent of a bias, in a model, across a plurality of group membership labels with respect to multiple attributes, the method comprising:
providing a training dataset having multiple training dataset attributes in a plurality of training images of the training dataset;
training the model to identify one of the plurality of group membership labels for a training image object in each of the plurality of training images, wherein the training associates the one of the plurality of group membership labels with multiple ones of the multiple training dataset attributes;
operating the trained model on a plurality of test images of a test dataset, each of the plurality of test images including a test image object and multiple test dataset attributes, to identify one of the group membership labels for each test image object based on the multiple test dataset attributes; and
determining a bias amplification in the identification of one of the plurality of group membership labels for each test image object in each of the plurality of test images.

18. The non-transitory computer readable storage medium of claim 17, wherein:
the test image object and the training image object are images of people;
the bias is gender bias; and
the plurality of group membership labels includes a male gender label and a female gender label.

19. The non-transitory computer readable storage medium of claim 17, wherein the multiple training dataset attributes and the multiple test dataset attributes include at least one of actions, describing each of the plurality of training images and each of the plurality of test images, respectively, or physical objects within each of the plurality of training images and each of the plurality of test images, respectively.

20. The non-transitory computer readable storage medium of claim 17, wherein the method further comprises reducing the bias amplification by generating synthetically balanced datasets based on at least one of the training dataset and the test dataset.

* * * * *